Aug. 26, 1952     G. E. GAGNIER     2,607,965
WEATHERSTRIP CONSTRUCTION
Filed Nov. 10, 1948
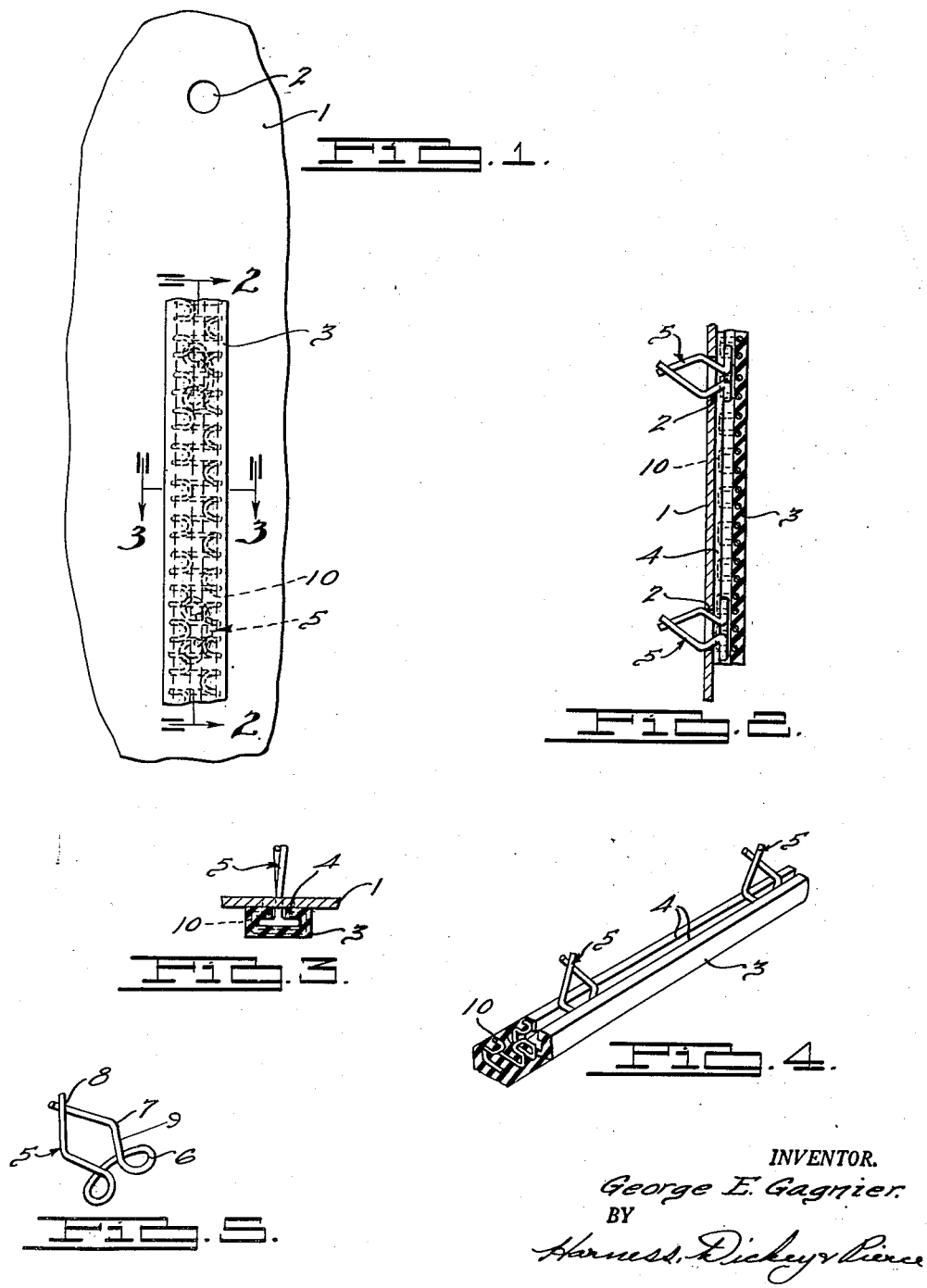
INVENTOR.
George E. Gagnier.
BY
Harness, Dickey & Pierce
ATTORNEYS Patented Aug. 26, 1952

2,607,965

UNITED STATES PATENT OFFICE 2,607,965

WEATHER STRIP CONSTRUCTION

George E. Gagnier, Detroit, Mich., assignor to Gagnier Fibre Products Company, Detroit, Mich., a corporation of Michigan Application November 10, 1948, Serial No. 59,346

5 Claims. (Cl. 20—69)

This invention relates generally to weatherstripping constructions. More particularly it relates to a novel and improved weatherstripping construction primarily designed and intended for use in automotive vehicle bodies or similar sheet metal structures.

The primary object of the present invention is to provide a weatherstrip which has the inherent resiliency necessary for proper sealing and which, at the same time, is provided with reinforcing means which serve to aid making possible the anchoring of the strip to sheet metal panels.

Still further, the invention contemplates the provision of a weatherstrip construction which has a metallic reinforcing element therein, said reinforcing element being preferably entirely embedded in the rubber of which the weatherstrip is formed and being preformed in such a way as not to materially impair the flexibility of the weatherstrip.

As is well recognized, weatherstrips of the type commonly used in automobile bodies must be sufficiently flexible so that they can conform themselves to the tortuous paths required to define the various door and window, as well as other openings which they are intended to seal and yet should be capable of being positively anchored to the sheet metal panels with which they are to be associated.

The present invention contemplates the provision of a rubber or rubberlike strip of uniform cross-sectional configuration throughout its entire length. This strip may be generally channel shaped with flanges overhanging the channel thereof to provide a generally T-shaped recess adapted to receive and anchor the heads of clips for anchoring the strip to the sheet metal paneling with which the strip is to be associated.

Yet further, the present invention contemplates the provision of a weatherstrip construction which is easily and conveniently anchored to sheet metal paneling by substantially conventional fastening clips.

Many other and further objects, advantages and features of the present invention will become clearly apparent from a consideration of the following specification when taken in connection with the accompanying drawings forming a part thereof.

In the drawings:

Figure 1 is a fragmentary plan view of a portion of a sheet metal panel with one form of the improved weatherstrip anchored in position thereon;

Fig. 2 is a longitudinal sectional view taken substantially along the line 2—2 of Fig. 1, illustrating in detail the manner in which the mounting clips serve to anchor the weatherstripping element to the panel;

Fig. 3 is a transverse sectional view taken substantially along the line 3—3 of Fig. 1, illustrating in detail one form of cross-sectional configuration of weatherstripping element embodying the improvements of the present invention;

Fig. 4 is a fragmentary perspective view with parts broken away illustrating the form of weatherstripping element shown in the preceding figures and showing in detail one preferred form of metallic reinforcing element and the manner in which the same is embedded in the weatherstripping element; and Fig. 5 is a perspective view of one form of wire anchoring clip which readily lends itself to use in mounting the weatherstripping element shown in the preceding figures to sheet metal paneling.

With more particular reference to the drawings, it will be readily appreciated that while only one very specific and detailed form of the invention is shown and described, the general principles illustrated may be substantially modified without departing from the general spirit and scope of the invention.

As is seen by reference to Fig. 1 of the drawings, a sheet metal panel 1 may be provided with suitably spaced pierced apertures 2 lying along the line where it is desired to attach a weatherstripping element.

The improved weatherstripping element 3 is generally channel shaped in cross-section with overlying flanges 4 having their adjacent marginal edges spaced apart slightly, yet, at the same time, substantially overlying the base of the channel thereby providing a generally T-shaped recess of uniform cross-sectional configuration extending throughout the length of the weatherstripping element.

This T-shaped recess serves to receive the head of a wire anchoring clip generally designated 5. This clip is preferably formed with a relatively flat oval-shaped head portion 6, from which depend opposing leg portions 7. These leg portions 7 have their extreme ends lying adjacent one another to provide a tapering prong portion 8 adapted for easy insertion into one of the apertures 2 in the paneling 1. The leg portions 7, as will be seen by reference to Fig. 5, are formed to diverge outwardly providing cam portions 9 which serve to engage the margin of the aperture in the paneling and draw the weatherstripping snugly against the surface thereof.

The weatherstripping element 3 may be formed of rubber, sponge rubber or other suitable resilient or rubberlike material and at the time it is molded or extruded it has embedded therein a suitable metallic reinforcing element 10, best seen in Fig. 4. This reinforcing element is preferably formed of wire and sinuously bent in a series of similar convolutions so as to extend not only through the base of the channel, but up through the side walls thereof and out into the flanges overlying the base of the channel element. It should be noted that this reinforcing element is completely and entirely embedded in the rubber so that no portion thereof is exposed at any point.

It should be noted that because of the sinuous manner in which the wire reinforcing element is bent it does not materially impair the flexibility of the weatherstripping element as a whole, but it does greatly strengthen the anchorage for the head of the clip element.

From the foregoing it will be readily apparent that many other and further modifications of the specific construction shown in the drawings and described may be made without departing from the spirit of the invention and the scope thereof as defined in the subjoined claims.

What is claimed is:

1. A weatherstripping element constructed substantially of rubber, said element being generally channel shaped in cross-section and having flanges formed thereon extending inwardly to overlie the base of said channel, the adjacent edges of said flanges being spaced apart materially less than the base of said channel whereby to provide a recess of substantially T-shape extending throughout the entire length of said channel, and metallic wire reinforcing means completely embedded in said rubber and preformed to generally surround said T-shaped recess.

2. A weatherstripping element constructed substantially of rubber, said element being generally channel shaped in cross-section and having longitudinally extending flanges extending throughout the length of the strip and overlying the base of the channel, said flanges having their adjacent edges spaced apart materially less than the width of the base of said channel whereby to define a recess extending throughout the length of said strip, said recess being generally T-shaped in cross-section and a sinuously bent wire reinforcing element completely embedded in said rubber and preformed to have portions thereof lying on all sides of said recess.

3. A weatherstripping element constructed substantially of rubber, said element being generally channel shaped in cross-section, and having longitudinally extending flanges extending throughout the length of the strip and overlying the base of the channel, said flanges having their adjacent edges spaced apart materially less than the width of the base of said channel whereby to define a recess extending throughout the length of said strip, said recess being generally T-shaped in cross-section, and a wire reinforcing element completely and entirely embedded in said rubber, said reinforcing element being sinuously bent in lateral convolutions so that portions thereof lie on all sides of said recess.

4. A weatherstrip comprising a body of deformable yieldable material having a channel of T-cross section running lengthwise of the strip with the stem portion of the T opening through one side of the strip, a resilient reinforcing member extending lengthwise of the channel and comprising a length of wire of sinuous configuration having the loop portions return-bent, the loop portions and the portions of the wire connecting said loop portions extending transversely of the strip along the walls defining the T-shaped channel.

5. The weatherstrip defined in claim 4 wherein said reinforcing member is completely embedded in the body of the yieldable material.

GEORGE E. GAGNIER.

REFERENCES CITED

The following references are of record in the file of this patent:

UNITED STATES PATENTS

| Number | Name | Date |
|---|---|---|
| 2,169,503 | Schlegel | Aug. 15, 1939 |
| 2,176,964 | Harrah | Oct. 24, 1939 |
| 2,195,046 | Best | Mar. 26, 1940 |
| 2,267,433 | Tea | Dec. 23, 1941 |
| 2,283,783 | Barr | May 19, 1942 |
| 2,313,419 | Bush | Mar. 9, 1943 |

FOREIGN PATENTS

| Number | Country | Date |
|---|---|---|
| 102,938 | Australia | 1938 |